United States Patent [19]

Borzym

[11] Patent Number: 4,646,601
[45] Date of Patent: Mar. 3, 1987

[54] INDEXIBLE CROSS-CUT BLADE AND BLADE HOLDER FOR TUBE CUT-OFF MACHINES

[75] Inventor: John J. Borzym, Birmingham, Mich.
[73] Assignee: Alpha Industries, Inc., Novi, Mich.
[21] Appl. No.: 763,210
[22] Filed: Aug. 7, 1985
[51] Int. Cl.$^4$ ............... B23D 21/00; B26D 3/16
[52] U.S. Cl. .................................. 83/385; 83/54; 83/319; 83/519; 83/926 H
[58] Field of Search ............ 83/54, 926 H, 385, 319, 83/519; 407/113, 17

[56] References Cited

U.S. PATENT DOCUMENTS

| | | | |
|---|---|---|---|
| 3,934,319 | 1/1976 | Schuler | 407/113 |
| 3,938,415 | 2/1976 | Borzym | 83/519 X |
| 4,108,029 | 8/1978 | Borzym | 83/54 |
| 4,320,996 | 3/1982 | Roos | 407/113 X |
| 4,499,803 | 2/1985 | Borzym et al. | 83/54 X |
| 4,557,639 | 12/1985 | Fischer | 407/17 X |

FOREIGN PATENT DOCUMENTS

| | | | |
|---|---|---|---|
| 2628624 | 12/1977 | Fed. Rep. of Germany | 407/113 |
| 1135944 | 12/1968 | United Kingdom | 407/113 |

Primary Examiner—Frank T. Yost
Attorney, Agent, or Firm—Krass & Young

[57] ABSTRACT

An indexible notching blade for a double-cut tube cut-off die set wherein the notching blade is triangular in configuration to provide three individual cutting edges. Both pull-across and thrust type configurations are disclosed.

2 Claims, 6 Drawing Figures

INDEXIBLE CROSS-CUT BLADE AND BLADE HOLDER FOR TUBE CUT-OFF MACHINES

TECHNICAL FIELD

This invention relates to cut-off machinery for tubing and particularly to an improved notching blade apparatus for use in a double-cut tube cut-off die set which produces dimple-free, guillotine type severing operations.

BACKGROUND OF THE INVENTION

It is now well known that relatively dimple-free tube end configurations can be realized in a guillotine type cutting operation wherein a notching apparatus cuts a shallow groove in the exterior tube wall transverse to the tube axis just prior to the entry of the severing blade tip into the notched portion of the tube wall. This notching function reduces or eliminates the tendency of the tube wall to collapse upon entry of the severing blade. The advantage of this "double-cut" operation lies in the reduction or elimination of secondary operations to restore the tube end to a round configuration.

The notching apparatus typically comprises a notching blade holder which is interconnected with the upper platen of the die set by way of a mechanical cam and cam follower such that the descent of the upper platen toward the tube causes the notching blade holder to travel through a transverse path across the tube; both thrust and "pull-across" motions are known. See, for example, U.S. Pat. Nos. 4,109,555, issued Aug. 29, 1978 and 4,294,147, issued Oct. 13, 1981.

Various blade configurations have evolved, some of which include hook portions and all of which include sharp points defined by intersecting blade edges to form the actual steel cutting area. Some of these blades are irregular in shape but are reversely symmetrical so that the same blade may be rotated 180° to present a new cutting area when the first cutting area becomes dull and ineffective.

SUMMARY OF THE INVENTION

The present invention provides a notching apparatus for use in a dimple-free, double-cut type machine, whether it be a die set or an integrated cutter and press arrangement, in which the notching blade provides three or more cutting areas of equal effectiveness through a simple process of indexing or rotation and in which the notching blade is capable of use in both a thrust or forward notching motion and a "pull-across" or reverse notching motion. In general, this is accomplished through the provision of a notching blade which takes the form of a regular polyhedron and in the preferred form is a simple triangle, the edge surfaces of which intersect at sharp angles to produce three cutting areas of equal effectiveness.

In the preferred form, the notching blade of the subject invention is mounted in a pocket in a notching blade holder which can be thrust across the tube axis during descent of the severing blade to notch the top wall of the tube just prior to the entry of the severing blade tip. The blade holder is caused to move laterally across the tube transverse to the direction of the tube axis as the main cut-off blade descends and to remain extended across the tube as the severing blade severs the tube by driving through the notch in the top of the tube wall created by the movement of the notching apparatus across the tube. So that the severing blade clears the notching apparatus as it descends, a portion of the arm which carries the notching blade is offset from the path of travel of the cut-off blade.

Claims to the notching blade per se, and especially to the triangular configuration, are presented in my continuation application, Ser. No. 906,977, filed Sept. 15, 1986.

IN THE DRAWING

DETAILED DESCRIPTION OF THE ILLUSTRATIVE EMBODIMENTS

Figure 1:
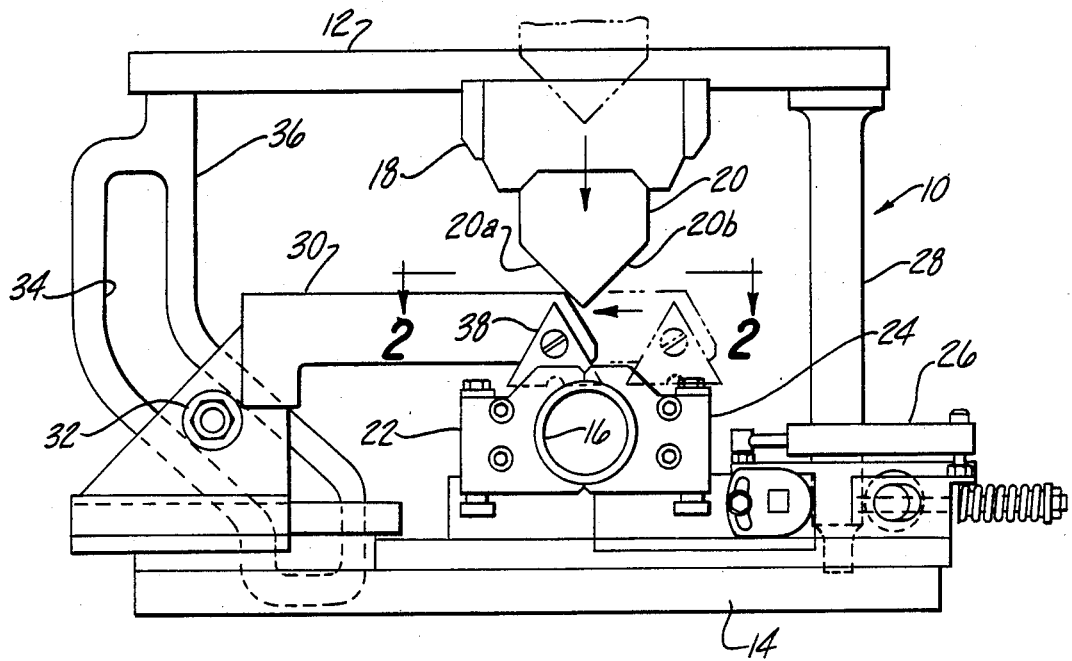
FIG. 1 is a simplified plan view of a double-cut tube cutting apparatus embodying the invention wherein the notching function is of the pull-across type.
Figure 2:
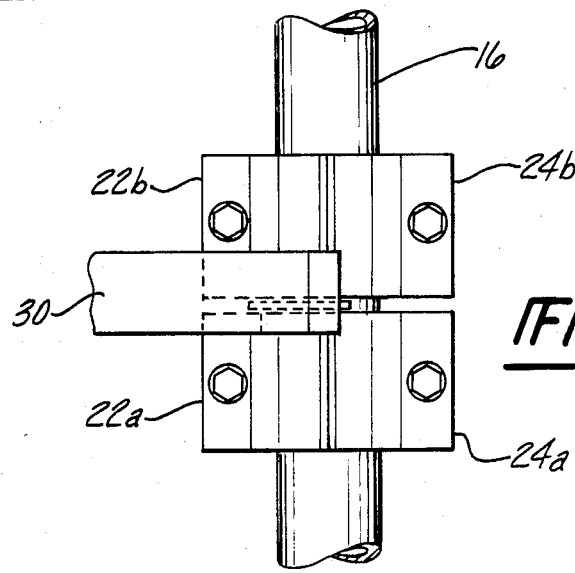
FIG. 2 is top plan view of the tube clamping and notching portions of the apparatus of FIG. 1.
Figure 3:
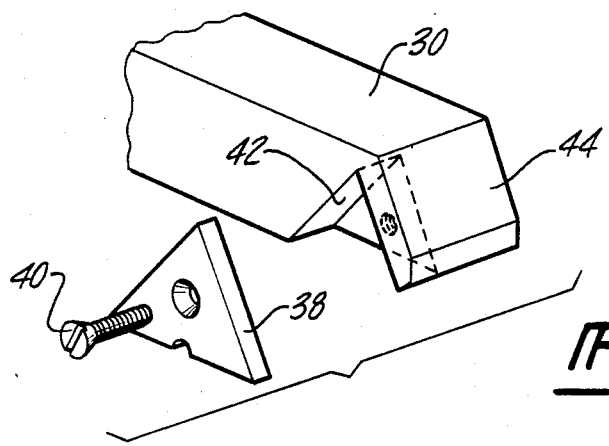
FIG. 3 is a perspective view of the notching blade and blade holder in the apparatus of FIG. 1.

Referring to FIGS. 1-3, a tube cut-off die set 10 is shown to comprise an upper platen 12 and a lower platen assembly 14 arranged to reciprocate vertically when driven by a press or the like to sever steel tubing 16 into various lengths. The guide pins and bushings which are typically employed to direct and stabilize the reciprocal motion of the machine 10 have been eliminated from the drawing for purposes of simplicity but are well understood by those skilled in the art. For an illustration of such apparatus, reference may be taken to U.S. Pat. No. 4,109,555, issued Oct. 13, 1981.

Although the description of both embodiments in this patent makes reference to relatively thin wall steel tubing of round sectional configuration, it is to be understood that the invention may be utilized in connection with the severing of tubing having various diameters, various wall thicknesses, made from various materials including alloys and having various cross-sectional configurations. In short, the words "tube" and "tubing," as used in this document, are to be given broad scope.

Upper platen 12 carries a severing or vertical blade holder 18 which in turn carries a severing blade 20 having leading edges 20a and 20b which intersect to form a piercing point. The travel of the blade 20 is at right angles to the longitudinal tube 16 and the width of the blade 20 is such that the entire tube 16 is severed as the blade passes through the plane of the tube.

Lower platen assembly 14 carries a conventional tube clamping apparatus consisting in part of clamping jaw sets 22 and 24 which are opened and closed by means of a mechanism 26 in response to vertical motion of a depending cam 28 which is affixed to the upper platen 12. Jaw set 22 comprises spaced apart jaws 22a and 22b which are separated by sufficient spacing to admit travel of the blade 20. Jaw set 24 comprises spaced apart jaws 24a and 24b (FIG. 2). The details of the apparatus 26,28 are more fully described in U.S. Pat. No. 4,294,147, issued Oct. 13, 1981.

The machine 10 further comprises a notching blade holder 30 which is slidably mounted on the lower platen assembly 14 and which further comprises a cam follower 32 operating within the internal track 34 of a mechanical cam 36 which depends from the upper platen 12. The shape of the track 34 is such that the notching blade holder lies in and across the path of the severing blade 20 when the die set is full open (dotted line configuration in FIG. 1) and is pulled or drawn across the vertical path of blade 20 as the die closes; i.e., as the upper platen 12 descends toward the lower platen assembly 14 due to actuation of the press.

Notching blade holder 30 carries a triangular notching blade 38 which is held by a screw 40 in a pocket 42 near the distal end of the blade holder 30. As shown in FIG. 1, the triangular notching blade 38 is seated within the pocket 42 but extends beyond the lower edge of the notching blade holder 30 so as to present one of the points formed by the intersections of the lateral blade edges to the tube 16 and to cut a notch across the top of the tube wall as the notching blade holder 30 is drawn from right to left in the view of FIG. 1. Blade 38 is preferably marked along one edge to assist the operator in selecting an initial installation position and monitoring the progress of the blade as it is indexed between the three possible mounting positions over its useful life.

Notching blade 38, as is clear from the illustrations of FIGS. 1 and 2, is a regular polyhedron and therefore is indexible to provide a new and fresh cutting edge simply by removing the blade from the pocket 42 and rotating the blade about an angle which is less than 180°; in the case of the triangle, an angle of 120°.

To conserve stroke in the machine 10, the angle of the surface 44 of the notching blade holder 30 is angled to at least approximate the angle of the leading edge 20a of the severing blade 20. Because of this configuration, the notching blade holder 30 and the severing blade 20 may occupy respective portions of the same plane during the cutting operation, this condition actually being illustrated in FIG. 1 of the drawing.

Figure 4:
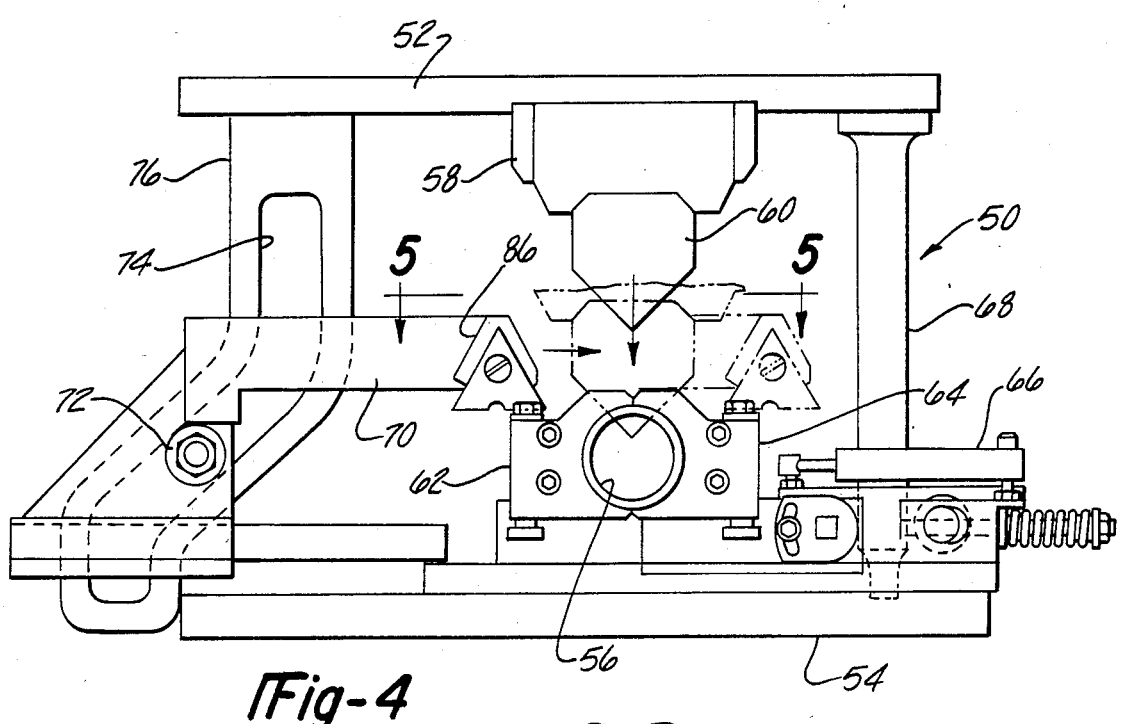
FIG. 4 is a simplified plan view of a tube cut-off die set embodying the invention wherein the notching function is of the thrust type.
Figure 5:
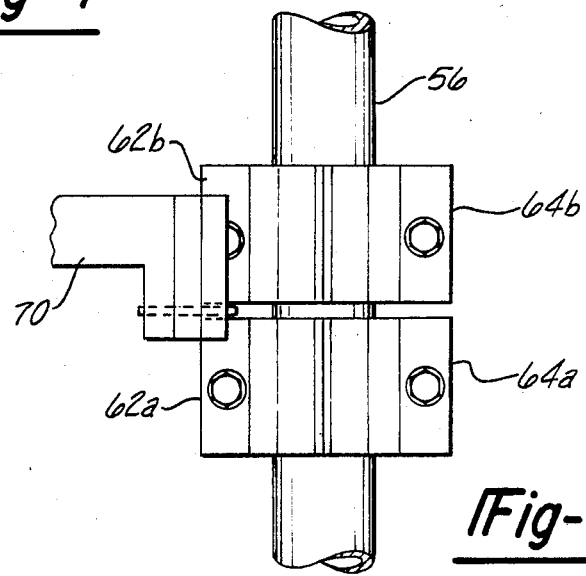
FIG. 5 is a top plan view of the tube clamping and notching apparatus in the device of FIG. 4.
Figure 6:
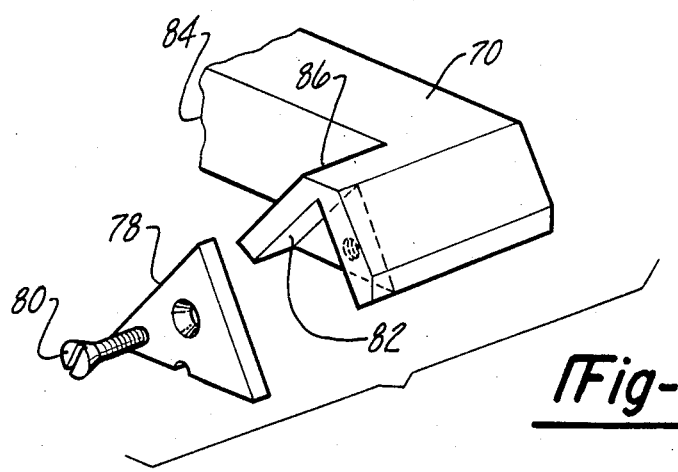
FIG. 6 is a perspective view of a detail of the notching blade and blade holder in the apparatus of FIG. 4.

Referring now to FIGS. 4–6, a second embodiment of the invention is illustrated in which the cross-cutting or notching function is accomplished by thrusting the notching blade forwardly across the tubing and across the vertical descent path of the severing blade as it descends.

More specifically, the cut-off machine 50 comprises an upper platen 52 and a lower platen assembly 54 which are interconnected by guide pins and bushings (not shown) for controlled reciprocal motion when actuated by a press or other power source. A severing blade holder 58 is secured to the upper platen 52 and carries therein a conventional primary guillotine-type severing blade 60 which is operable to sever lengths from the steel tubing 56.

The tubing 56 is clamped for the severing operation in clamping jaws 62 and 64 which are opened and closed by apparatus 66 in response to vertical travel of the depending cam 68 mounted on the upper platen 52. The structure identified by reference characters 62, 64, 66 and 68 is identical to that identified by reference characters 22, 24, 26 and 28 in the embodiment of FIGS. 1–3.

A notching blade holder 70 is slidably mounted on the lower platen assembly 54 and driven in a predetermined coordinated motion with the vertical travel of the upper platen 52 and the severing blade 60 by means of a cam follower 72 which rides within the angled internal track 74 of a cam 76 which depends from the upper platen assembly 52. The configuration of the cam track 74 is such that the notching blade holder 70 occupies a home or rest position which is clear of the vertical path of the severing blade 60 when the machine 50 is full open, but is driven across and through the vertical path of the severing blade 60 as the machine 50 closes.

The notching blade holder 70 is provided with a seat 82 near the distal end thereof to receive a notching blade 78 of triangular configuration. The notching blade 78 is held in place by means of a machine screw 80.

The clamping jaws 62 and 64 are divided into spaced apart sets 62a,62b and 64a,64b as shown in FIG. 5. The spacing between the sets of clamping jaws is sufficient to admit entry of both the notching edge of the notching blade 78 and the severing blade 60 during their respective operations.

Because, in the embodiment of FIGS. 4–6, the notching blade holder 70 is driven toward an extended position in which it effectively extends across the vertical descent path of the severing blade 60, the central portion of the notching blade holder 70 is offset as shown at 84 so that it lies adjacent but outside of the actual path of the severing blade 60. Again, to shorten the required stroke length for a double-cut operation and compact the apparatus as much as possible both physically and in terms of operating time, the surface 86 of the blade seat portion of the notching blade holder 70 is angled to at least approximate the angle of the leading edges of the severing blade 60 so that they may actually occupy respective portions of the same vertical and horizontal plane at the same time.

As was the case with the embodiment of FIGS. 1–3, the notching blade 78 is a regular polyhedron, in this case triangular, and provides three separate cutting or notching areas which are selectable, one after the other, simply by withdrawing the screw 80 and rotating the notching blade 78 through an angle of 120°. It will be noted that the triangular is notching blade not only indexible to provide a new blade surface but operates with equal effectiveness in both pull-across (first embodiment) and thrust (second embodiment) configurations.

It will be understood and appreciated by those skilled in the art that various changes and modifications to the invention and to the environmental apparatus disclosed herein may be made without departing from the spirit and scope of the invention as defined in the following claims. For example, the blades 38 and 78 may take the form of a square.

I claim:

1. In a tube cut-off machine of the type which comprises a severing apparatus for severing a length of tube and a notching apparatus for notching the tube wall transverse to the direction of severance to reduce the tendency of the severance to dimple the tube, the improvement comprising:
a lower platen assembly;
means disposed on said lower platen assembly for securing said tube in a position to be severed;
an upper platen assembly;
a severing blade secured to said upper platen assembly and movable with said upper platen assembly toward said lower platen assembly to sever said tube;
notching apparatus including an arm and means interconnecting said arm with the upper platen assembly to cause said arm to move laterally across said tube transverse to the direction of movement of said cut-off blade as said upper platen assembly descends toward said lower platen assembly and to remain extended across said tube as the severing blade severs said tube, said arm being offset from the path of travel of said severing blade to provide clearance for said severing blade while said arm is in the extended position; and a notching blade carried by said arm at an extremity thereof for cutting a notch in said tube in alignment with the path of travel of the descending severing blade.

2. Apparatus as defined in claim 1 wherein said notching blade is triangular in configuration.

* * * * *